United States Patent
Rubner (10) Patent No.: US 11,285,688 B2
(45) Date of Patent: Mar. 29, 2022

(54) FIBER COMPOSITE COMPONENT, STRUCTURAL COMPONENT, AND PRODUCTION METHOD

(71) Applicant: Wobben Properties GmbH, Aurich (DE)

(72) Inventor: Florian Rubner, Aurich (DE)

(73) Assignee: Wobben Properties GmbH, Aurich (DE)

(*) Notice: Subject to any disclaimer, the term of this patent is extended or adjusted under 35 U.S.C. 154(b) by 238 days.

(21) Appl. No.: 16/067,035

(22) PCT Filed: Dec. 22, 2016

(86) PCT No.: PCT/EP2016/082288
§ 371 (c)(1),
(2) Date: Jun. 28, 2018

(87) PCT Pub. No.: WO2017/118578
PCT Pub. Date: Jul. 13, 2017

(65) Prior Publication Data
US 2019/0001610 A1    Jan. 3, 2019

(30) Foreign Application Priority Data

Jan. 6, 2016 (DE) ...................... 10 2016 100 191.0

(51) Int. Cl.
*B32B 3/26* (2006.01)
*B32B 5/12* (2006.01)
(Continued)

(52) U.S. Cl.
CPC .............. *B32B 3/266* (2013.01); *B29C 70/20* (2013.01); *B29C 70/545* (2013.01); *B32B 3/06* (2013.01);
(Continued)

(58) Field of Classification Search
CPC ...... F03D 1/065; F03D 1/0658; F03D 1/0675; F03D 1/0683; F05B 2240/30;
(Continued)

(56) References Cited

U.S. PATENT DOCUMENTS 4,724,598 A    2/1988  Roe
5,173,358 A *  12/1992 Anahara ................. B29C 70/24
                                                 442/206
(Continued)

FOREIGN PATENT DOCUMENTS

DE          10128054 A1 *  7/2003  ............. B23B 3/266
DE      102010046609 A1    5/2011
(Continued)

OTHER PUBLICATIONS

English machine translation of DE 10 2011 054 168 A1, Mar. 11, 2020.*
(Continued)

*Primary Examiner* — Christopher Verdier
(74) *Attorney, Agent, or Firm* — Seed Intellectual Property Law Group LLP (57) ABSTRACT

A fiber composite component, comprising a basic element which comprises fibers embedded in a matrix material. A production method for a fiber composite component. A structural component, comprising a support element and the reinforcement element and also a production method for a structural component. The fiber composite component comprises a base element, comprising fibers embedded in a matrix material, and a reinforcement element, comprising fibers embedded in a matrix material wherein the base element and the reinforcement element are interconnected, a hole leads through the base element and the reinforcement element, wherein fibers of the base element that are adjacent (Continued)

to the hole are severed, and fibers of the reinforcement element that are adjacent to the hole are continuous.

16 Claims, 7 Drawing Sheets

(51) Int. Cl.
| | | |
|---|---|---|
| B29C 70/20 | (2006.01) | |
| B32B 7/12 | (2006.01) | |
| B29C 70/54 | (2006.01) | |
| B32B 15/18 | (2006.01) | |
| B32B 3/06 | (2006.01) | |
| B32B 5/02 | (2006.01) | |
| B32B 9/04 | (2006.01) | |
| B32B 15/08 | (2006.01) | |
| B32B 21/08 | (2006.01) | |
| B32B 15/20 | (2006.01) | |
| B32B 5/26 | (2006.01) | |
| B32B 27/08 | (2006.01) | |
| B32B 15/14 | (2006.01) | |
| B32B 5/14 | (2006.01) | |
| B32B 9/00 | (2006.01) | |
| B32B 5/08 | (2006.01) | |
| B32B 27/06 | (2006.01) | |
| B32B 27/12 | (2006.01) | |
| B32B 7/04 | (2019.01) | |
| B32B 3/30 | (2006.01) | |
| B32B 7/05 | (2019.01) | |
| B32B 21/10 | (2006.01) | |
| F03D 1/06 | (2006.01) | |
| B32B 37/12 | (2006.01) | |
| B29L 31/08 | (2006.01) | |

(52) U.S. Cl.
CPC ............... *B32B 3/263* (2013.01); *B32B 3/30* (2013.01); *B32B 5/022* (2013.01); *B32B 5/024* (2013.01); *B32B 5/026* (2013.01); *B32B 5/08* (2013.01); *B32B 5/12* (2013.01); *B32B 5/145* (2013.01); *B32B 5/26* (2013.01); *B32B 7/04* (2013.01); *B32B 7/05* (2019.01); *B32B 7/12* (2013.01); *B32B 9/007* (2013.01); *B32B 9/04* (2013.01); *B32B 9/041* (2013.01); *B32B 9/045* (2013.01); *B32B 15/08* (2013.01); *B32B 15/14* (2013.01); *B32B 15/18* (2013.01); *B32B 15/20* (2013.01); *B32B 21/08* (2013.01); *B32B 21/10* (2013.01); *B32B 27/06* (2013.01); *B32B 27/08* (2013.01); *B32B 27/12* (2013.01); *B32B 37/12* (2013.01); *F03D 1/065* (2013.01); *F03D 1/0658* (2013.01); *B29C 2793/0045* (2013.01); *B29L 2031/085* (2013.01); *B32B 2250/20* (2013.01); *B32B 2260/021* (2013.01); *B32B 2260/023* (2013.01); *B32B 2260/044* (2013.01); *B32B 2260/046* (2013.01); *B32B 2262/0253* (2013.01); *B32B 2262/0269* (2013.01); *B32B 2262/0276* (2013.01); *B32B 2262/065* (2013.01); *B32B 2262/10* (2013.01); *B32B 2262/101* (2013.01); *B32B 2262/103* (2013.01); *B32B 2262/105* (2013.01); *B32B 2262/106* (2013.01); *B32B 2262/14* (2013.01); *B32B 2307/706* (2013.01); *B32B 2307/708* (2013.01); *B32B 2603/00* (2013.01); *B32B 2605/08* (2013.01); *B32B 2605/18* (2013.01); *F05B 2240/221* (2013.01); *F05B 2240/30* (2013.01); *F05B 2240/912* (2013.01); *F05B 2280/6003* (2013.01); *Y02P 70/50* (2015.11)

(58) Field of Classification Search
CPC ........ F05B 2240/301; F05B 2280/6003; F05B 2280/6013; B32B 3/06; B32B 3/266; B32B 5/022; B32B 5/024; B32B 5/026; B32B 5/26; B32B 2250/20; B32B 2260/023; B32B 5/12; B29C 70/16; B29C 70/20
See application file for complete search history.

(56) References Cited

U.S. PATENT DOCUMENTS

| | | | |
|---|---|---|---|
| 2007/0081900 A1* | 4/2007 | Nies | .............. F03D 1/065 416/224 |
| 2014/0197569 A1 | 7/2014 | Polewarczyk et al. | |
| 2015/0132137 A1* | 5/2015 | Humblot | .............. F03D 1/0683 416/212 R |
| 2016/0052233 A1 | 2/2016 | Kaigome et al. | |
| 2016/0375633 A1* | 12/2016 | Bergstrom | .............. D04H 3/04 428/188 |
| 2017/0008250 A1 | 1/2017 | Kashiwagi et al. | |

FOREIGN PATENT DOCUMENTS

| | | | | |
|---|---|---|---|---|
| DE | 102011054168 A1 | | 4/2013 | |
| DE | 102014100182 A1 | | 7/2014 | |
| DE | 102015102437 | | 8/2015 | |
| EP | 2982871 A1 | | 2/2016 | |
| FR | 2951400 A1 | | 4/2011 | |
| JP | S55-78819 A | | 6/1980 | |
| JP | S55-90433 U | | 6/1980 | |
| JP | S62297517 A | | 12/1987 | |
| JP | S6342819 A | | 2/1988 | |
| JP | 2012-61672 A | * | 3/2012 | ........ B29L 2031/737 |
| JP | 2013-203004 A | | 10/2013 | |
| WO | 2008119409 A1 | | 10/2008 | |
| WO | 2014162789 A1 | | 10/2014 | |
| WO | 2015146690 A1 | | 10/2015 | |

OTHER PUBLICATIONS

English machine translation of FR 2951400, Mar. 11, 2020.*
English machine translation of DE 10128054-A1, Jan. 31, 2021.*
English machine translation of JP 2012-61672-A, Jan. 31, 2021.*

* cited by examiner

FIBER COMPOSITE COMPONENT, STRUCTURAL COMPONENT, AND PRODUCTION METHOD

BACKGROUND

Technical Field

The invention relates to a fiber composite component, comprising a basic element which comprises fibers embedded in a matrix material. The invention furthermore relates to a production method for a fiber composite component. The invention furthermore relates to a structural component, comprising a support element and the reinforcement element. The invention moreover relates to a production method for a structural component.

Description of the Related Art

Fiber composite components of the type mentioned at the outset are produced substantially from fiber composite materials which have two main component parts. The main component parts are a matrix material and fibers, wherein the main component parts have a mutual reciprocity such that the fiber composite material has properties that are superior than any of the two individual participating main component parts.

The matrix material configures the matrix which hold the fibers in their respective positions and transmit and distribute stresses between the fibers. Moreover, the matrix serves for protecting the fibers against external mechanical and chemical inferences. The fibers increase the strength of the material, said strength, depending on the fiber orientation in the matrix, is either direction-dependent (anisotropic) or direction-independent (isotropic).

Fiber composite materials are used in various sectors of technology, in particular for applications in which a low component weight, or generally a lightweight construction, respectively, and high strengths are targeted. Exemplary products for the application of fiber composite materials are aircraft, automobiles, rotors for wind power installations, or items of sports equipment.

Structural components of the type mentioned at the outset can be found as component parts of technical products in a large number of technical products. The materials used for producing structural components include, for example, steel, aluminum, titanium, other metallic materials, castings, plastics materials, timber, and/or other materials.

Products which comprise fiber composite components and/or structural components are often composed of more than one component, this leading to the components having to be interconnected. For this purpose, holes, preferably bores, are often incorporated in the fiber composite components and/or structural components, in order for a screw connection or another releasable and/or non-releasable connection to be attached, for example. The holes herein act as notches, such that a notch effect arises on the fiber composite component or structural component. The components at these locations are weakened on account of a concentration of stress, and a technical failure of the components can arise.

The German patent and trademark office in the priority application pertaining to the present application has researched the following prior art: DE 10 2010 046 609 A1, DE 10 2014 100 182 A1, EP 2 982 871 A1, WO 2008/119 409 A1, and WO 2015/146 690 A1.

BRIEF SUMMARY

Provided is a fiber composite component and a structural component, and a method for producing a fiber composite component and a structural component, said components and method reducing or eliminating one or a plurality of the disadvantages mentioned. Provided is a fiber composite component and a structural component, and a method for producing a fiber composite component and a structural component, said components and method reducing and/or relieving a weakening of the component in the region of the holes.

Provided is a fiber composite component comprising a base element comprising fibers embedded in a matrix material, and comprising a reinforcement element comprising fibers embedded in a matrix material, wherein the base element and the reinforcement element are interconnected, a hole leads through the base element and the reinforcement element, wherein fibers of the base element that are adjacent to the hole are severed, and fibers of the reinforcement element that are adjacent to the hole are continuous.

The fiber composite component has a base element which comprises or is composed of a matrix material and fibers embedded therein. The base element herein is to be understood as a component part of a technical component, for example an integral rotor or part of a rotor of a wind power installation.

The base element is furthermore produced from a fiber composite material, wherein the fiber composite material comprises or is composed of substantially the matrix material and the fibers. The fibers are preferably incorporated as prefabricated semi-finished product such that the fiber direction is determined by the semi-finished product used. For example, the exact direction of the fiber orientation at various locations of the base element can be determinable only to a limited extent.

The invention is based inter alia on the insight that a notched fiber composite component that is impinged with a force is imparted a local concentration of stress. By virtue of the latter, component regions having a concentration of stress in existing solutions are often reinforced in such a manner that the force-absorbing cross section is enlarged and the stress is thus reduced. A usual measure for enlarging the force-absorbing cross section is the provision of more material in respective component regions.

Therefore, a material thickening is often provided in the prior art such that the component despite the notch effect has an adequate strength. A material thickening designed in such a manner in general results in a high increase in terms of weight which particularly in the case of fiber composite materials acts counter to the enforced lightweight construction effect. Moreover, the material thickening designed in such a manner restricts the constructive freedom and can impede the aesthetic appeal. Furthermore, a material thickening designed in such a manner is associated with high costs since fiber composite materials are typically characterized by a high price of materials.

The fiber composite component is based inter alia on the insight that a heavy material thickening and the disadvantages explained of a material thickening of this type can be avoided by way of a reinforcement element. The reinforcement element is a component part of the fiber composite component and is connected to the base element. The reinforcement element is disposed in a region of the base element in which a concentration of stress arises, for example by way of a hole, and enables the material thickening previously provided here to be replaced.

The reinforcement element likewise comprises or is composed of a fiber composite material, wherein the fiber composite material is composed substantially of a matrix material and fibers. The fiber composite material of the reinforcement element partially or completely preferably comprises the same matrix material and/or partially or completely the same fibers as the base element. Alternatively, the fiber composite material of the reinforcement element may not comprise the same matrix material and/or not the same fibers as the base element.

The shape of the reinforcement element is preferably adapted to the stress situation in the fiber composite component. The geometrical shape of the reinforcement element herein is preferably determined by way of a simulation of the forces or the flux of force, respectively, and/or the stresses in the base element and in the reinforcement element. Furthermore, the orientation of the fibers can be adapted so as to correspond to the respective force flux direction prevailing locally, so as to achieve a rigidity of the material which is as high as possible and to minimize the input of materials. A simulation of this type can be performed, for example, based on the finite element method. The reinforcement element in a particularly preferred embodiment has an elongate cross section. The cross section here is to be understood such that this is a cross section running orthogonally to a longitudinal action of the hole in the region of the reinforcement element. The cross section of the reinforcement element can in principle assume any shape, wherein said shape is determined in particular by the flux of force. The reinforcement element can preferably have a circular or square cross section. Furthermore preferably, the height of the reinforcement element, measured parallel with a passage axis of the hole, is greatest in the center and/or in the region of the hole of the reinforcement element, wherein the height decreases toward the sides and enables a preferably flush transition to the base element.

Alternatively, a geometrical standard can be defined for the reinforcement element such that the reinforcement element is suitable for a majority of base elements and stress situations. This alternative variant enables a particularly cost-effective production of the reinforcement element by virtue of the increased production volume.

Reinforcement elements of the type described when compared with the conventional material thickening offer the advantage of a higher rigidity by virtue of the continuous fibers of the fiber composite material, such that less material has to be used. Therefore, the advantages of an improved utilization of materials, of a lower weight, of an improved visual appeal, and of lower costs can be implemented.

The reinforcement element furthermore comprises a region or a side which is configured to serve as a support face, preferably in order for the reinforcement element to be attached to the base element. The base element accordingly likewise has a suitable region or a suitable side for the reinforcement element to be attached to the base element. These faces are furthermore preferably mutually adapted such that the support face of the reinforcement element fully contacts the support face of the base element.

The base element and the reinforcement element are furthermore interconnected. In the present context, interconnected can preferably mean that the base element and the reinforcement element bear on one another in one or a plurality of regions. The connection between the base element and the reinforcement element can be configured in a materially integral, force-fitting, and/or form-fitting manner. A materially integral connection between the base element and the reinforcement element is particularly preferred. This connection is furthermore preferably designed so as to be releasable in order for the fiber composite component to be disassembled, for example in order for wearing parts to be replaced and/or for more simple transportation to be enabled.

The fiber composite component is furthermore based on the insight that connection elements which require a hole in one or a plurality of the components to be connected are often used for connecting a plurality of fiber composite components. Therefore, a hole leads through the base element and through the reinforcement element. The hole herein has a cross section which is preferably identical across the entire axial length of the hole, or alternatively preferably is variable across the axial length of the hole. There is in particular the possibility of designing the cross section of the hole in the region of the base element differently than in the region of the reinforcement element. This diversity can relate to the diameter of the hole and/or to the geometry of the cross section of the hole. The hole can furthermore preferably have a substantially round, oval, triangular, or polygonal, slot-shaped, and/or geometrically undefined cross section.

The hole is furthermore preferably provided as a through hole. The hole in this preferred variant leads completely through the base element and through the reinforcement element. Alternatively preferably, the hole is provided as a blind hole. The hole in this preferred variant either leads completely through the reinforcement element, but does not exit the base element again, or the hole leads completely through the base element, but does not exit the reinforcement element again.

The fibers of the fiber composite material of the base element that are adjacent to the hole are substantially severed. The hole rim of the hole of the base element is preferably formed substantially by the separation faces of the severed fibers that are adjacent to the hole and by the matrix material. The fibers of the hole rim, or in the region of the hole rim, respectively, are preferably severed in and/or by the production of the hole, for example by a drilling procedure. No fibers run in the hole, or through the hole, of the base element, respectively, nor in the hole, or through the hole, of the reinforcement element, respectively.

Fibers of the fiber composite material of the reinforcement element that are adjacent to the hole are continuous. Continuous in this context is to be understood in particular in that the fibers included in the reinforcement element, in particular not the fibers running in the region of the hole rim, are not severed and thus also do not have any separation faces. The fibers preferably run continuously around the hole, in particular in the region of the hole rim. The fibers furthermore preferably run substantially in a tangential direction around the hole and/or tangentially along the hole rim.

The transmission of force within the fiber composite material in the case of non-continuous fibers is less homogeneous than in fiber composite materials having continuous fibers. The continuity of the fibers accordingly has the particular advantage that the strength of the component is particularly high. Furthermore, the described arrangement of the fibers in the reinforcement element has the advantage that the fibers are compressed in the environment of the hole, in particular in the region of the hole rim, such that the strength specifically in this region that is typically more stressed is again positively influenced.

Severed or continuous fibers, respectively, in this description are to be understood such that this refers to the fibers in their respective appearance or processed state, respectively. When the fibers of the base element are disposed within the matrix material as woven fabrics, and/or cross-laid structures, and/or multi-axis cross-laid structures, and/or embroideries, and/or non-woven material, and/or mats, and/or braided fabrics, severed fibers accordingly also refers to severed woven fabrics, cross-laid structures, multi-axis cross-laid structures, embroideries, non-woven material, mats, and/or braided fabrics, or to parts or portions thereof, respectively. When the fibers of the reinforcement element are disposed within the matrix material as, for example, fiber bundles, preferably as rovings, continuous fibers accordingly also refers to continuous fiber bundles or rovings, or to parts or portions thereof, respectively. Fiber bundles or rovings of a usual (commercially available) quality are preferably used, in particular having usual splices.

The combination of a base element in which a hole is produced in a conventional manner and in which hole the fibers are severed, with a reinforcement element in which the fibers are laid such that the latter run continuously around the hole, has the advantage that the cost savings in the production of the base element, and the increased strength and rigidity of the reinforcement element, can be unified in a common fiber composite component.

In the case of one preferred embodiment of the fiber composite component the fibers of the base element are disposed within the matrix material as woven fabrics, and/or cross-laid structures, and/or multi-axis cross-laid structures, and/or embroideries, and/or non-woven material, and/or mats, and/or braided fabrics, and the fibers or the reinforcement element are present as fiber bundles, preferably as rovings.

The fibers of the base element are preferably already present as a semi-finished product in one or a plurality of the aforementioned forms. On account thereof, there is the potential of an economical fabrication of the base element, and in particular also the potential of being able to produce very voluminous elements by way of a justifiable effort in terms of time. However, on account of the utilization of semi-finished products of this type there is typically no potential for specific, delicate geometrical elements such as, for example, holes, to be generated already during the laying up of the semi-finished products.

The fibers of the reinforcement element are present in the form of fiber bundles, preferably rovings, which can be laid up in a very flexible manner, thus also enabling complex geometries to be generated. A fiber bundle is composed of one fiber or else from more than one fiber. Should the fiber bundle be composed of more than one fiber, the fibers are disposed so as to be substantially parallel, said fibers preferably being so-called filament fibers. Fiber bundles and especially rovings are usually categorized according to the number of fibers thereof or according to the mass per length unit thereof.

The fiber bundles can be laid up so as to be oriented in terms of the flux of force, such that a very high strength of the material can be achieved. Fibers laid up so as to be oriented in terms of the flux of force are to be understood such that the fiber bundles are laid up along the main load paths, or the main stresses. Laying up fiber bundles so as to be oriented in terms of the flux of force therefore requires a degree of knowledge pertaining to the flux of force running in the component, or to the direction of the stresses acting in a localized manner in the component, respectively. This knowledge is preferably acquired by way of a simulation, furthermore preferably based on a finite element simulation. This high strength in turn typically results in less material being required for absorbing stresses that are induced by external forces. The high degree of flexibility in the laying up of fiber bundles results in the fibers being able to be laid up around geometrical elements, for example.

A further preferred embodiment of the fiber composite component provides that the fibers of the base element and/or of the reinforcement element comprise or are composed of organic fibers and/or inorganic fibers and/or natural fibers.

Inorganic fibers are, for example, glass fibers, basalt fibers, boron fibers, ceramic fibers, or steel fibers. Organic fibers are, for example, aramid fibers, carbon fibers, polyester fibers, and polyethylene fibers (in particular high performance polyethylene (HPPE) fibers such as, for example, Dyneema fibers). Natural fibers are, for example, hemp fibers, flax fibers, or sisal fibers.

In one variant of a preferred embodiment of the fiber composite component, the fibers of the base element are composed exclusively of glass fibers or exclusively of carbon fibers or exclusively of aramid fibers. In a further variant of a preferred embodiment the base element comprises two dissimilar fibers selected from glass fibers, carbon fibers, and aramid fibers. A further variant of a preferred embodiment provides that the base element comprises glass fibers, carbon fibers, and aramid fibers. The fibers of the base element can furthermore preferably also be composed of or comprise another fiber which is configured so as to be and suitable for being processed in a fiber composite material.

In one variant of a preferred embodiment of the fiber composite component, the fibers of the reinforcement element are composed exclusively of glass fibers or exclusively of carbon fibers or exclusively of aramid fibers. In a further variant of a preferred embodiment the reinforcement element comprises two dissimilar fibers selected from glass fibers, carbon fibers, and aramid fibers. A further variant of a preferred embodiment provides that the reinforcement element comprises glass fibers, carbon fibers, and aramid fibers. The fibers of the reinforcement element can furthermore preferably be composed of or comprise another fiber which is configured so as to be and suitable for being processed in a fiber composite material.

The provision of only a single fiber type, for example exclusively glass fibers, is advantageous in that no rigidity leaps are created within the component, and the production in general is simplified. Furthermore, the advantages of the one fiber can be completely utilized. The provision of two or more types of fibers, for example glass fibers and aramid fibers, or glass fibers and carbon fibers, can bring about an advantage in terms of the utilization of the specific advantages of the fibers used.

A further preferred refinement of the fiber composite component provides that the matrix material of the base element and/or of the reinforcement element comprises or is composed of a plastics material, and the plastics material preferably comprises or is composed of a thermoplastic plastics material and/or a thermosetting plastics material, and/or that the matrix material of the base element and/or of the reinforcement element comprises or is composed of cement and/or comprises or is composed of concrete and/or comprises or is composed of metal and/or comprises or is composed of ceramics and/or comprises or is composed of carbon.

A matrix having a thermoplastic matrix has the advantage that the fiber composite component generated can still be formed and welded. The cause thereof lies in particular in that the thermoplastic matrix material can be melted multiple times. Fiber composite components which comprise or are composed of a thermosetting plastics material as matrix material are distinguished by a particularly high strength.

The use of cement, concrete, metal, ceramics, and/or carbon enables the specific advantages of the materials mentioned to be utilized, said advantages relating in particular but not exclusively to the rigidity properties of said materials in terms of tensile and/or compressive forces, the specific weight of said materials, and/or or the processing capabilities of said materials.

A further preferred embodiment of the fiber composite component provides that the base element and the reinforcement element are interconnected in a materially integral and/or form-fitting manner, and/or the base element and the reinforcement element are interconnected by way of fibers which are embedded in the matrix material of the base element and in the matrix material of the reinforcement element, and/or the reinforcement element at an end of the hole that faces away from the base element has a bearing face for receiving a connection element, said bearing face being planar in a manner orthogonal to the passage direction of the hole.

A materially integral connection of this type is in particular to be understood as a connection which is established by the mutual material engagement of the participating materials. A further substance which enables the mutual material engagement is preferably used for the connection of elements. In a further variant of this preferred embodiment the materially integral connection is implemented using an adhesive. An adhesive is to be understood as a material which interconnects at least two elements by adhesion and/or cohesion. The adhesive furthermore preferably comprises the same material as the matrix material of the base element and/or of the reinforcement element. The adhesive furthermore preferably is composed of the same material as the matrix material of the base element and/or of the reinforcement element.

According to a further preferred refinement the base element and the reinforcement element are interconnected by way of fibers which are embedded in the matrix material of the base element and in the matrix material of the reinforcement element. The fibers for connecting the base element and the reinforcement element can be the same fibers which the base element and/or the reinforcement element comprise. These fibers are furthermore preferably selected from glass fibers, carbon fibers, and/or aramid fibers. In one particular variant of this preferred refinement of the fiber composite component, the matrix material of the base element and/or of the reinforcement element is additionally present or incorporated, respectively, at the connection point between the base element and the reinforcement element. Furthermore preferably a matrix material which is not the matrix material of the base element and/or of the reinforcement element is additionally present and/or incorporated at the connection point between the base element and the reinforcement element. The fibers by way of which the base element and the reinforcement element are interconnected can preferably be present as fiber bundles, preferably rovings, and/or or be configured as woven fabrics, cross-laid structures, multi-axis cross-laid structures, embroideries, non-woven material, mats, and/or braided fabrics, or parts or portions thereof, respectively.

A connection between the base element and the reinforcement element by way of fibers enables a high strength of the connection and a homogeneity of the fiber composite component. Such a connection between the base element and the reinforcement element is particularly advantageous on account of the potential of reducing stress leaps. A very positive lifespan of the connection furthermore results. Furthermore, the forces which are transmitted in the base element and in the reinforcement element, or the fluxes of forces which are created, respectively, are transmitted in a particularly advantageous manner.

A further preferred design embodiment of the fiber composite component provides that the base element and the reinforcement element are interconnected in a form-fitting manner. A form-fitting connection is created by the mutual engagement of at least two elements to be connected such as is the case, for example, in a tongue-and-groove connection, a dovetail connection, or a splined key.

In a further variant of a preferred embodiment of the fiber composite component the reinforcement element at an end of the hole that faces away from the base element has a bearing face for receiving a connection element, said bearing element being planar in a manner orthogonal to the passage direction of the hole. The bearing face is incorporated in the reinforcement element in the surrounding area of the hole such that a washer can be attached to the bearing face, for example, such that the hole and an opening of the washer have the same passage direction and a screw can be introduced into the hole through the opening of the washer, for example. The bearing face furthermore preferably serves for receiving directly a screw head. Alternatively preferably, a further fastening means is introduced into the hole, said further fastening means by way of a portion and/or a region bearing on the bearing face.

In terms of further advantages, variants of embodiment, and details of embodiments of the fiber composite component and of the refinements thereof, reference is also made to the description hereunder pertaining to the features of the associated production method.

Provided is a reinforcement element comprising fibers embedded in the matrix material, wherein a hole leads through the reinforcement element, and the hole in the production of the reinforcement element is configured from fibers and from a matrix material in such a manner that the fibers that are adjacent to the hole are continuous.

The reinforcement element and the potential refinements thereof have features which render said reinforcement element particularly suitable for use in a fiber composite component and a structural component and the refinements of said components. In terms of advantages, variants of embodiments, and details of embodiments of the reinforcement element and of the refinements thereof, reference is made to the description pertaining to the respective features of the fiber composite component and of the structural component.

Provided is a structural component comprising a support element and a reinforcement element according to the previously described aspect of the invention, wherein the support element and the reinforcement element are interconnected, and a hole leads through the support element and the reinforcement element.

The structural component is a component part of a technical product. The structural component herein can be the single component of the technical product, or else be a component part besides other component parts. The structural component furthermore has a support element which preferably comprises or is composed of steel, aluminum, titanium, other metallic products, plastics material, timber, and/or other materials. The support element furthermore preferably comprises a cast material or is composed of one or a plurality of cast materials. The reinforcement element has the above-described properties, functions, embodiments, and the like as the reinforcement element according to the above-described aspects of the invention.

The support element and the reinforcement element are furthermore interconnected. Interconnected in the present context can preferably mean that the support element and the reinforcement element bear on one another in one or a plurality of regions. The connection between the support element and the reinforcement element can be configured so as to be materially integral, force-fitting, and/or form-fitting. A materially integral connection between the base element and the reinforcement element is particularly preferred. Furthermore preferably, this connection is designed so as to be releasable in order for the structural component to be disassembled, for example in order for wearing parts to be replaced and/or in order to enable more simple transportation.

The hole leads through the support element and through the reinforcement element. The hole herein has a cross section which is preferably identical across the entire axial length of the hole, or alternatively preferably is variable across the axial length of the hole. There is in particular the possibility of designing the cross section of the hole in the region of the support element differently than in the region of the reinforcement element. This diversity can relate to the diameter of the hole and/or to the geometry of the cross section of the hole. The hole can furthermore preferably have a substantially round, oval, triangular, or polygonal, slot-shaped, and/or geometrically undefined cross section.

The hole is furthermore preferably provided as a through hole. The hole in this preferred variant leads completely through the support element and through the reinforcement element. Alternatively preferably, the hole is provided as a blind hole. The hole in this preferred variant either leads completely through the reinforcement element, but does not exit the support element again, or the hole leads completely through the support element, but does not exit the reinforcement element again.

The structural component is similar to the above-described fiber composite component. In particular the support element of the structural component can be configured and refined as has been described in the context of the fiber composite component. A difference between the structural component and the above-described fiber composite component lies in that the support element of the structural component, as opposed to the base element of the fiber composite component, does not comprise any fibers embedded in a matrix material but comprises or is composed of another material. The reinforcement element can thus not only be advantageously used with base elements which are constructed as fiber/matrix elements, but can likewise be used with support elements which are constructed from other materials. A structural component of this type, having a support element and a reinforcement element, is particularly advantageous since there is the potential for a multiplicity of materials or combinations of materials, respectively, to be used. Such a structural component can moreover be used in particular in lightweight construction, wherein a high rigidity on account of corresponding reinforcement elements on notches can be achieved despite a small material volume. In terms of further advantages, reference is also made to the respective description of the fiber composite component, said advantages being applicable in an analogous manner to the structural component having a support element from a material other than that of the base material. The refinements that have been described with reference to the fiber composite component in particular also apply in an analogous manner to the structural component, taking into account the support element which is different from the base element.

In terms of further advantages, variants of embodiments, and details of embodiments of the structural component and of the refinements thereof, reference is also made to the description hereunder pertaining to the features of the associated production method.

Provided is an integral fiber composite component, comprising fibers embedded in a matrix material, wherein the integral fiber composite component has at least one local material thickening, a hole at the location of the material thickening leads through the integral fiber composite component, and the hole in the production of the integral fiber composite component from fibers and from a matrix material is configured in such a manner that the fibers that are adjacent to the hole are continuous.

The fibers of the integral fiber composite component preferably are or comprise glass fibers, carbon fibers, and/or aramid fibers. The matrix is formed by a matrix material which is preferably a plastics material or comprises a plastics material. A plastics material is particularly preferred since said plastics material typically has a low weight and accordingly contributes toward the lightweight construction mode of the integral fiber composite component.

The material thickening of the integral fiber composite component preferably has a substantially defined fiber orientation. The fibers are furthermore disposed in such a manner that said fibers run around a hole that is disposed at the location of the material thickening. Since the fibers run around the hole, said fibers are continuous and not severed.

Continuous in this context is to be understood in particular that the fibers that are included in the integral fiber composite component are not severed and thus also do not have any separation faces, in particular not those fibers that run in the region of a hole rim. The fibers preferably run continuously around the hole, in particular in the region of the hole rim. The fibers furthermore preferably run substantially in a tangential direction around the hole and/or tangentially along the hole rim.

An integral fiber composite component is particularly preferred since the strength in the region of the hole is very high by virtue of the continuous fibers. The strength is in particular higher than in the case of the material thickening having severed fibers that is provided in existing solutions, such that less material has to be used at the same strength, and complex geometries can be implemented.

Provided is a wind power installation having a tower, a nacelle, and a rotor, characterized in that the wind power installation comprises an above-described fiber composite component and/or an above-described structural component and/or integral fiber composite component according to one of the above-described aspects. In one particular variant of this embodiment, a base element is embodied as an aerodynamic rotor which is fastened to a hub of the wind power installation.

Provided is a production method for a fiber composite component, comprising the steps of producing a base element from fibers and from a matrix material, incorporating a first hole in the base element, wherein the fibers adjacent to the first hole are severed, producing a reinforcement element from fibers and from a matrix material in such a manner that a second hole is configured herein, the fibers adjacent to the second hole being continuous, and mutually arranging and interconnecting the base element and the reinforcement element in such a manner that the first hole and the second hole are interconnected, preferably have a common passage axis.

The production of the base element is preferably performed by using fibrous semi-finished products in which the fibers are gathered since said fibers, or individual fiber bundles, respectively, can be handled only with difficulty. There is furthermore the potential for fibrous semi-finished products that are already preimpregnated to be used. Preimpregnated fibrous semi-finished products are distinguished in that said preimpregnated fibrous semi-finished products not only already include the fibers but likewise the matrix material.

The first hole is incorporated into the base element preferably upon production of the base element. The first hole is preferably configured as a through hole having an opening on one side of the base element and an opening on the opposite side of the base element. The first hole is furthermore preferably embodied as a blind hole which only has an opening on one side of the base element.

The first hole can be incorporated into the base element in various ways. The manner is in particular dependent on the materials and on the cross section of the first hole. The cross section of the first hole is freely selectable within the context of the possibilities in terms of production technology. To this end, a separating production method such as, for example, drilling is preferably used. The fibers that are adjacent to the first hole to be produced are severed on account of the first hole being incorporated. Furthermore, a hole rim on which the fibers ends can be identified is configured on account of the incorporation of the first hole. The fiber ends can have dissimilar cross sections, the latter depending on the initial cross section of the fiber, on the one hand, and on the position of the fiber on the hole rim, on the other hand.

The production of the reinforcement element is preferably performed by laying up fiber bundles, preferably rovings. The laying up of the fiber bundles is performed in particular in such a manner that a second hole is configured at a defined location. The fiber bundles are therefore preferably disposed around said second hole such that no mechanical post-processing is required. Furthermore preferably, winding up to 0° is performed in the roving method. This production of the second hole results in fibers that are adjacent to the second hole being continuous. Continuous in this context is in particular to be understood such that no fibers that have been severed by the incorporation of the hole are present in the environment of the second hole. The second hole is preferably configured as a through hole which has two openings on opposite sides of the reinforcement element. Alternatively, the hole of the reinforcement element can be embodied as a blind hole which has an opening only on one side of the reinforcement element.

A cross section of the second hole that is configured so as to be orthogonal to the axial axis can have dissimilar geometries and can be designed so as to correspond to the stress situation on account of external and/or internal forces. The cross section is preferably circular, preferably oval, or furthermore preferably has a slot, or alternatively preferably three or more corners. The cross section in a particularly preferred variant has a consistent geometry and/or a consistent size across the entire axial length of the first and/or second hole. The cross section in a further preferred variant has a variable geometry and/or variable size across the axial length of the first and/or second hole.

Mutually arranging and interconnecting the base element and the reinforcement element is furthermore performed. The arrangement of the base element and of the reinforcement element is preferably performed in such a manner that the two holes are interconnected, this meaning that a connection is established between the first and the second hole, the two hole cross sections thus preferably at least partially overlapping. The first and the second hole preferably have a common passage axis. A common passage axis is particularly preferred since the hole preferably serves for attaching a fastening means. The two holes are preferably disposed so as to be coaxial. The common passage axis does not mandatorily have to lead through a respective center of the first hole and/or of the second hole. This is not the case in particular when the cross section of the first hole and/or of the second hole is not embodied so as to be round. Furthermore, the first and the second hole can be disposed so as to be mutually offset, wherein a common passage axis has to nevertheless be present in this case.

Therefore, the fastening means should be able to be completely or partially inserted through and/or into the first hole and the second hole. Connecting the base element to the reinforcement element is preferably performed in a materially integral and/or form-fitting and/or force-fitting manner.

One preferred embodiment of the production method provides that a placeholder is used for producing the second hole. The placeholder, prior to or during the laying up of the fiber bundles, is placed at the location at which the hole is to be produced. The fiber bundles during the production of the reinforcement element are laid up around the place holder. The placeholder preferably has the same cross section as that of the hole to be produced. The placeholder is removed from the reinforcement element at the end of the production process. The utilization of the placeholder results in particular in a hole which has a very high accuracy in terms of dimension and shape. There is furthermore the potential of accelerating the speed of laying up of the fiber bundles.

The production method of the fiber composite component and the refinements thereof have features which render said method and said refinements particularly suitable for producing a fiber composite component and the refinements of said fiber composite component. In terms of the advantages, variants of embodiments, and details of embodiments of the production method and of the refinements thereof, reference is therefore also made to the preceding description pertaining to the features of the device of the fiber composite component.

Provided is a production method of a reinforcement element, comprising the steps of producing a reinforcement element from fibers and from a matrix material, wherein a hole is configured and the fibers that are adjacent to the hole remain continuous.

The production method of the reinforcement element and the refinements thereof, the potential refinements thereof, have features which render said method and said refinements particularly suitable for producing a reinforcement element and the refinements of said reinforcement element. In terms of the advantages, variants of embodiments, and details of embodiments of the production method and of the refinements thereof, reference is therefore also made to the preceding description pertaining to the corresponding features of the device of the reinforcement element.

Provided is a production method of an integral fiber composite component, comprising the steps of producing an integral fiber composite component from fibers and from a matrix material in such a manner that a hole is configured herein, in the case of which the fibers that are adjacent to the hole are continuous.

The production of the integral fiber composite component is preferably performed by laying up fiber bundles, preferably rovings. The laying up of the fiber bundles is performed in particular in such a manner that the hole is configured at a defined location. Therefore, the fiber bundles are disposed around said hole such that preferably no mechanical post-processing is required. Winding up to 0° is furthermore preferably performed in the roving method. A placeholder is preferably used to produce the hole.

This production of the hole results in fibers that are adjacent to the hole being continuous. Continuous in this context is to be understood in particular such that there are no fibers that have been severed on account of the incorporation of the hole are present in the surrounding area of the hole. The hole is preferably configured as a through hole which has two openings on opposite sides of the integral fiber composite component.

A cross section of the hole that is configured so as to be orthogonal to the axial axis can have dissimilar geometries and can be designed so as to correspond to the stress situation on account of external and/or internal forces. The cross section is preferably circular, preferably oval, or furthermore preferably has a slot, or alternatively preferably three or more corners. The cross section in a particularly preferred variant has a consistent geometry and/or a consistent size across the entire axial length of the hole. The cross section can alternatively have a variable geometry and/or variable size across the axial length of hole.

Provided is a production method for an above-described structural component, said method comprising the steps of producing a support element, incorporating a hole in the support element, producing a reinforcement element having a hole, as has been described above, and mutually arranging and interconnecting the support element and the reinforcement element in such a manner that the hole of the support element and the hole of the reinforcement element are interconnected.

A multiplicity of different materials can be used for producing the support element such that specific requirements on account of the mechanical stress situation, on account of environmental influences, in terms of costs and/or of aesthetic aspects can in particular be considered. The production is particularly influenced also by the material to be processed. In the incorporation of the hole into the support element it is furthermore to be noted that the latter here is not a fiber-reinforced material such that said incorporation can generally by carried out with less complexity than in the case of the incorporation of the hole into the base element. This applies in particular in the case of the hole being incorporated by a subtractive manufacturing method.

The production method of the structural component has features which render said method particularly suitable for producing a structural component. In terms of advantages, variants of embodiment, and details of embodiments of the production method, reference is therefore also made to the preceding description pertaining to the respective features of the device of the structural component.

BRIEF DESCRIPTION OF THE SEVERAL VIEWS OF THE DRAWINGS

Preferred embodiments of the invention will be explained in an exemplary manner by means of the appended figures in which.

DETAILED DESCRIPTION

Figure 1:
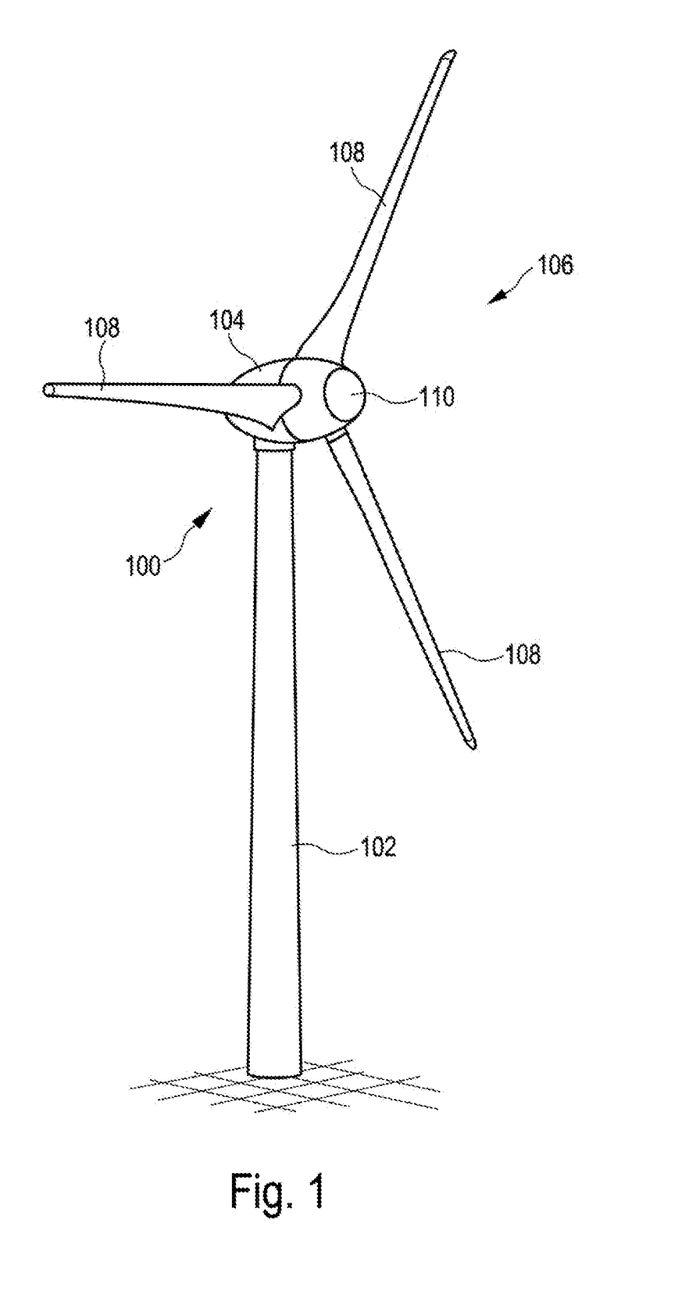
FIG. 1 shows a schematic illustration of the wind power installation.

FIG. 1 shows a schematic illustration of a wind power installation. FIG. 1 shows a wind power installation 100 having a tower 102 and a nacelle 104. A rotor 106 having three rotor blades 108 and a spinner 110 is disposed on the nacelle 104. The rotor 106 when in operation is set in rotary motion by the wind, and on account thereof drives a generator in the nacelle 104.

Fiber composite components and structural components according to the disclosure can be utilized for various components in the wind power installation 100. For example, the rotor blades 108 can be produced from fiber-reinforced plastics materials. The rotor blades 108 are preferably produced from a fiber-reinforced plastics material, here representing an embodiment of a base element 20 shown in FIGS. 2, 3, and 5. The rotor blades 108 have to be connected to the nacelle 104. This connection can comprise a reinforcement element.

Figure 2:
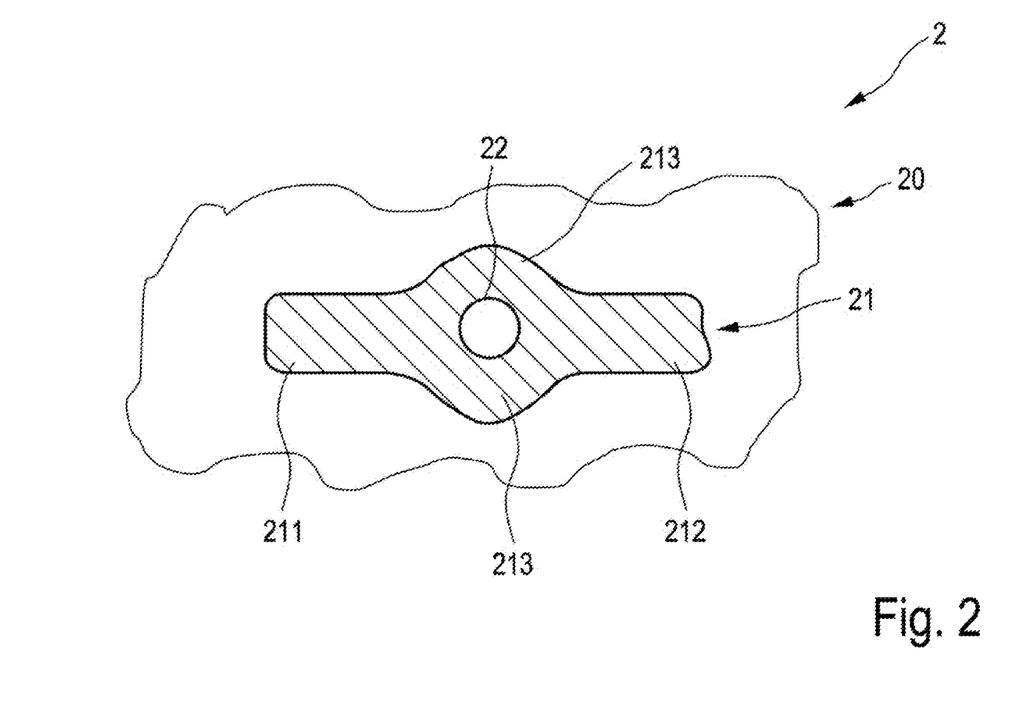
FIG. 2 shows a schematic horizontally sectioned cross sectional view of an exemplary embodiment of a fiber composite component according to the invention.

FIG. 2 shows a schematic horizontally sectioned cross sectional view of a fiber composite component 2, having a fragment of a base element 20 and a reinforcement element 21. A circular hole 22 leads through the reinforcement element 21 and through the base element 20. The hole 22 is located in the center of the reinforcement element 21 and has a circular cross section.

The reinforcement element 21 extends in the longitudinal direction from a first end 211 to a second end 212. The reinforcement element 21 at the first end 211 and at the second end 212 has in each case a slim end. The hole 21 is disposed between the first end 211 and the second end 212. The reinforcement element 21 between the first end 211 and the second end 212 furthermore has a widening 213. The widening 213 has the widest point thereof at a location where the hole 22 has its center. The width of the widening 213 decreases from this location in the longitudinal direction toward the first end 211 and toward the second end 212.

Figure 3A:
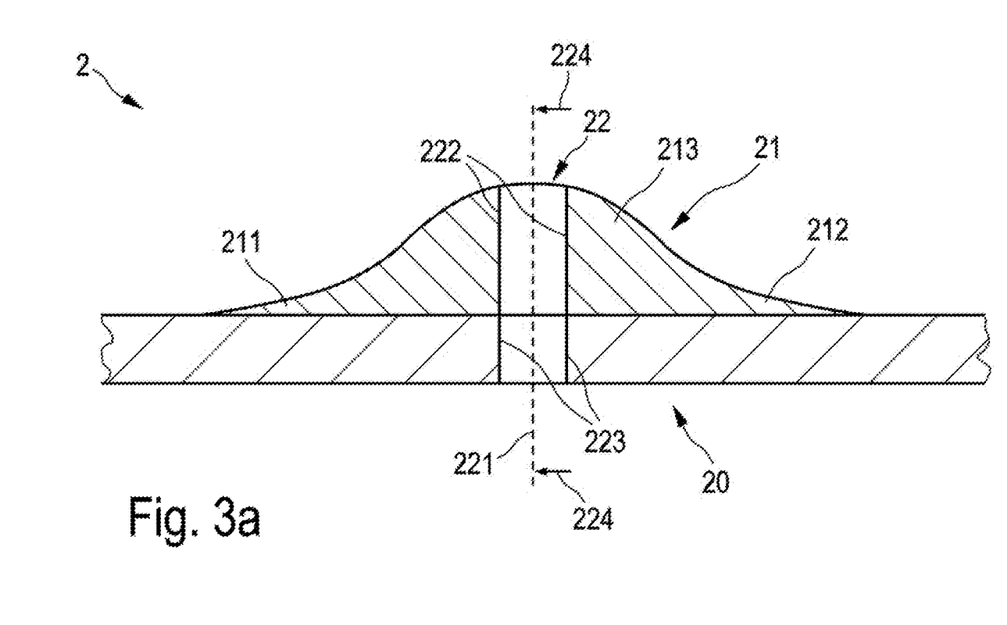
FIG. 3a shows a schematic vertically sectioned cross sectional view of an exemplary embodiment of a fiber composite component according to the invention.

FIG. 3a shows a schematic vertically sectioned cross sectional view of the fiber composite component 2, comprising a fragment of the base element 20 and the reinforcement element 21. The reinforcement element 21 is disposed on the base element 20 in such a manner that the entire base area of the reinforcement element 21 bears on the base element 20. The base element 20 can have a consistent height across the entire extent, wherein the ends here are sectioned in order to show that this is a fragment. The height can however also vary. The fiber composite component 2 has the hole 22, the latter being embodied as a through hole. The hole 22 furthermore has a passage axis 221 which runs axially through the center of the hole 22. The hole 22 in this exemplary embodiment is configured as a through hole which along the passage axis 221 has a cross section that is consistent in terms of the geometry and of the diameter. The hole 22 in relation to the elements surrounding the hole 22 is furthermore delimited by the first hole rim 222 thereof in the region of the reinforcement element 21, and by the second hole rim 223 thereof in the region of the base element 20.

The reinforcement element 21 of this preferred embodiment is configured so as to be mirror-symmetrical about the imaginary vertical axis 221 of the hole 22. The reinforcement element can also be configured so as to be asymmetrical, in particular when this is required by a specific flux of force, or a latter would appear to render this preferable. That side of the reinforcement element 21 that faces the base element 20 has a planar horizontal side on which the reinforcement element 21 physically contacts the base element 20. On that side that faces away from the base element 20, the reinforcement element 21 increases in height from the first end 211 toward the hole 22, so as to in turn decrease in height again toward the second end 212 and to assume the same height as at the first end 211. The component at the first end 211 and at the second end 212 has a small vertical dimension, and a comparatively large vertical dimension in the region of the widening 213.

Figure 3B:
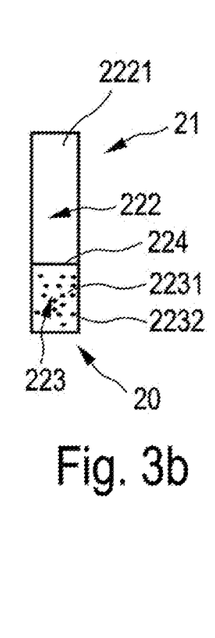
FIG. 3b shows a schematic view of a hole rim of the hole of an exemplary embodiment of a fiber composite component according to the invention.

FIG. 3b shows a schematic view of the first hole rim 222 and of the second hole rim 223 of the hole 22. The direction of the view of FIG. 3b is illustrated by way of the arrows 224 on the passage axis 221 of the hole 22 in FIG. 3a, wherein the view is directed in the direction of the tips of the arrows 224. Furthermore, a view of the base element 20 is illustrated below a horizontal line 224, and a view of the reinforcement element 21 is illustrated above the horizontal line 224. Furthermore, the first hole rim 222 in the region of the reinforcement element 21 is illustrated above the horizontal line 224, and the second hole rim 223 in the region of the base element 20 is illustrated below the horizontal line 224. The horizontal line 224 in FIG. 3b represents the joint between the base element 20 and the reinforcement element 21.

The matrix material 2221 of the reinforcement element 21 is exclusively to be seen in the region of the first hole rim 222; no fiber ends can be seen. The reason therefor lies in the fact that all of fibers of the reinforcement element 21 run continuously around the hole, thus no fibers being severed by incorporating the hole 22. A matrix material 2231, on the one hand, and fiber ends 2232, on the other hand, are illustrated in the region of the second hole rim 223. The reason therefor lies in the fact that the fibers of the base element 20 are laid up, and the hole 22 is subsequently incorporated into the base element 20, fibers that are adjacent to the hole rim 223 of the hole 22 being severed herein. The cutting faces or separation faces, respectively, of the fibers that are created herein are disposed as fiber ends 2232 on the second hole rim 223.

Figure 4:
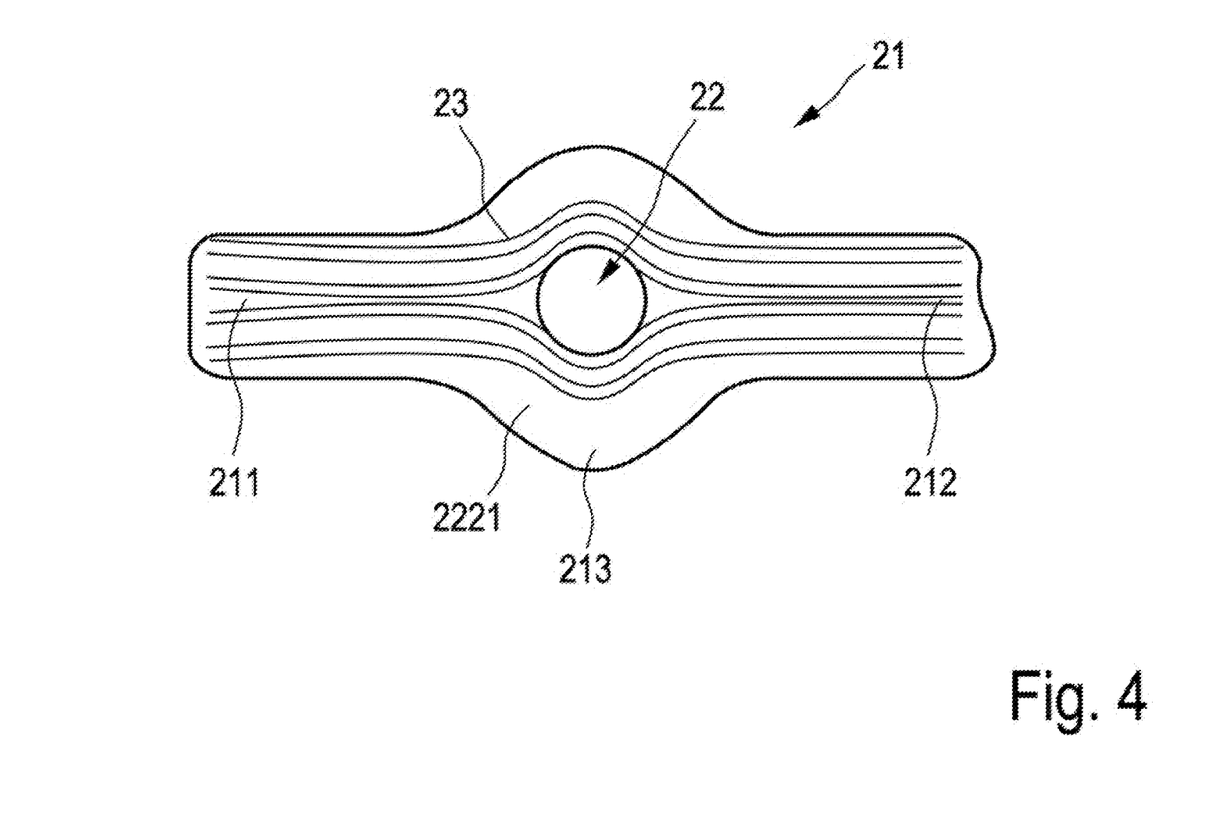
FIG. 4 shows a schematic horizontally sectioned cross sectional view of an exemplary embodiment of a reinforcement element of a fiber composite component according to the invention.

FIG. 4 shows a horizontally sectioned cross sectional view of the reinforcement element 21 of the fiber composite component 2. The external shape of the reinforcement element 21 has the shape shown in FIG. 2, said shape extending from the slim first end 211 to the slim second end 212, and a widening 213 between the first end 211 and the second end 212. The reinforcement element 21 furthermore has a hole 22 having a circular cross section, said hole 22 being located in the center of the reinforcement element 21. FIGS. 3b and 4 show the reinforcement element 21 having a mountain shape.

Moreover schematically illustrated are fibers 23 of the reinforcement element 21 that run in the fiber composite material. The orientation of the fibers 23, or the local alignment of the latter, respectively, can furthermore be seen. The fibers 23 in the region of the widening 213 are disposed around the hole 22, or around the first hole rim 222, respectively. The spacing between the fibers 23 in the region of the widening 213 is less than in the region of the first end 211 and of the second end 212. The first hole rim 222 in FIG. 3b, by virtue of this arrangement of the fibers 23 around the hole 22, does not have any severed fibers or fiber ends, respectively. The matrix material 2221 of the reinforcement element 21 is present wherever no fibers 23 are disposed.

Figure 5:
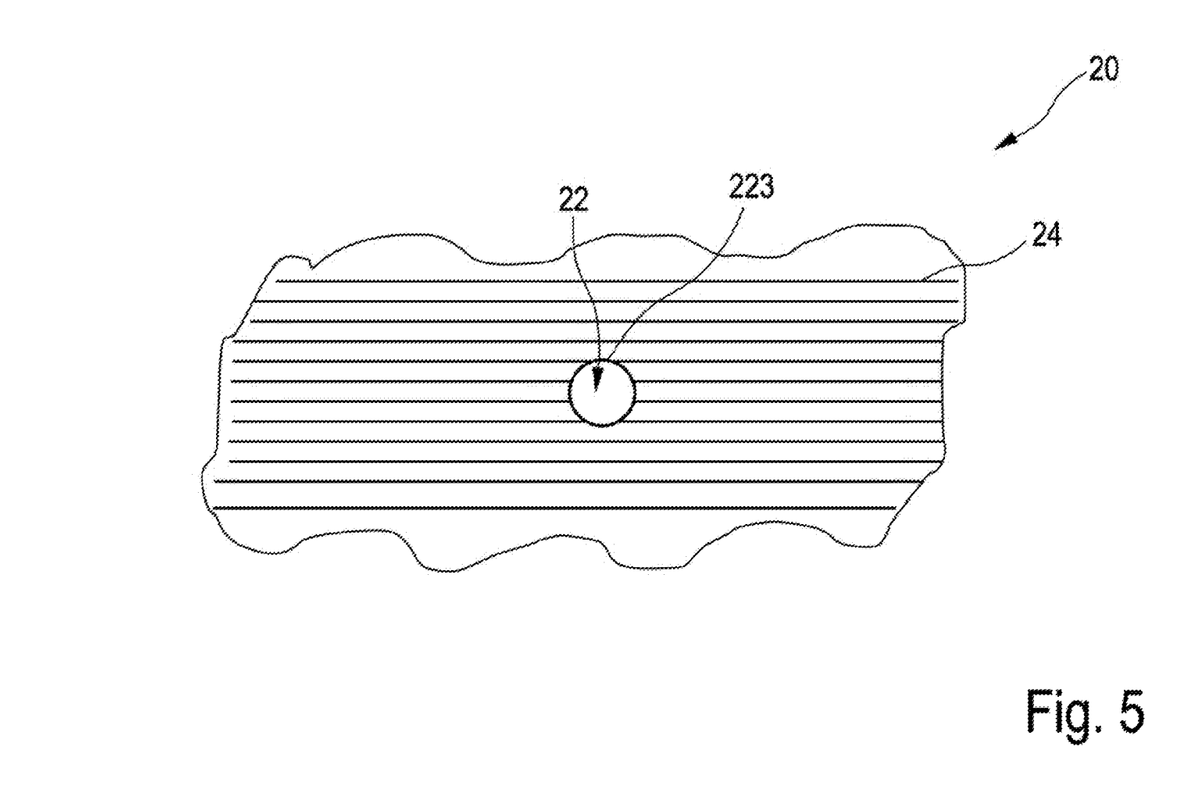
FIG. 5 shows a schematic horizontally sectioned cross sectional view of an exemplary embodiment of the base element of a fiber composite component according to the invention.

FIG. 5 shows a schematic horizontally sectioned cross sectional view of a fragment of the base element 20 of the fiber composite component 2. The hole 22 which is delimited in relation to the surrounding base element 20 by the hole rim 223 of said hole 22 is located in the center of the fragment of the base element 20. The fibers 24 that run in the fiber composite material of the base element 20 are furthermore schematically illustrated. The fibers 24 in the present exemplary embodiment are disposed as a cross-laid structure having parallel fibers.

FIG. 5 furthermore shows that the fibers 24 do not run around the hole as is the case in the reinforcement element 21, but are interrupted by the hole 22 and therefore are not continuous. The fibers 24 are consequently severed by the incorporation of the hole 22, the second hole rim 223 in FIG. 3b consequently having the fiber ends.

The fiber ends 2232 on the peripheries of the fragment in FIG. 3b are illustrated so as to be oval since the fibers 24, which in this exemplary embodiment are circular, are not severed in a manner orthogonal to the longitudinal direction of said fibers 24 at the peripheries, but depending on the position of said fibers 24 in the hole rim 223 are severed at an angle to the orthogonal direction of said fibers 24 in relation to the longitudinal direction. In other words, the fibers 24 are cut laterally. There is furthermore the potential for the fibers 24 to be merely trimmed such that only the diameter of said fibers 24 is reduced.

The fiber composite component 2 and the potential refinements thereof therefore make it possible for the fiber composite component to advantageously be connected to a further component. In particular, the material thicknesses that are often provided in existing solutions are substituted. Besides the base element 20, the reinforcement element 21 and the hole 22 through which a screw can be routed, for example, are provided for this purpose. A material-saving arrangement having a higher strength, which furthermore is associated with lower costs, is in particular enabled by the arrangement described.

Figure 6:
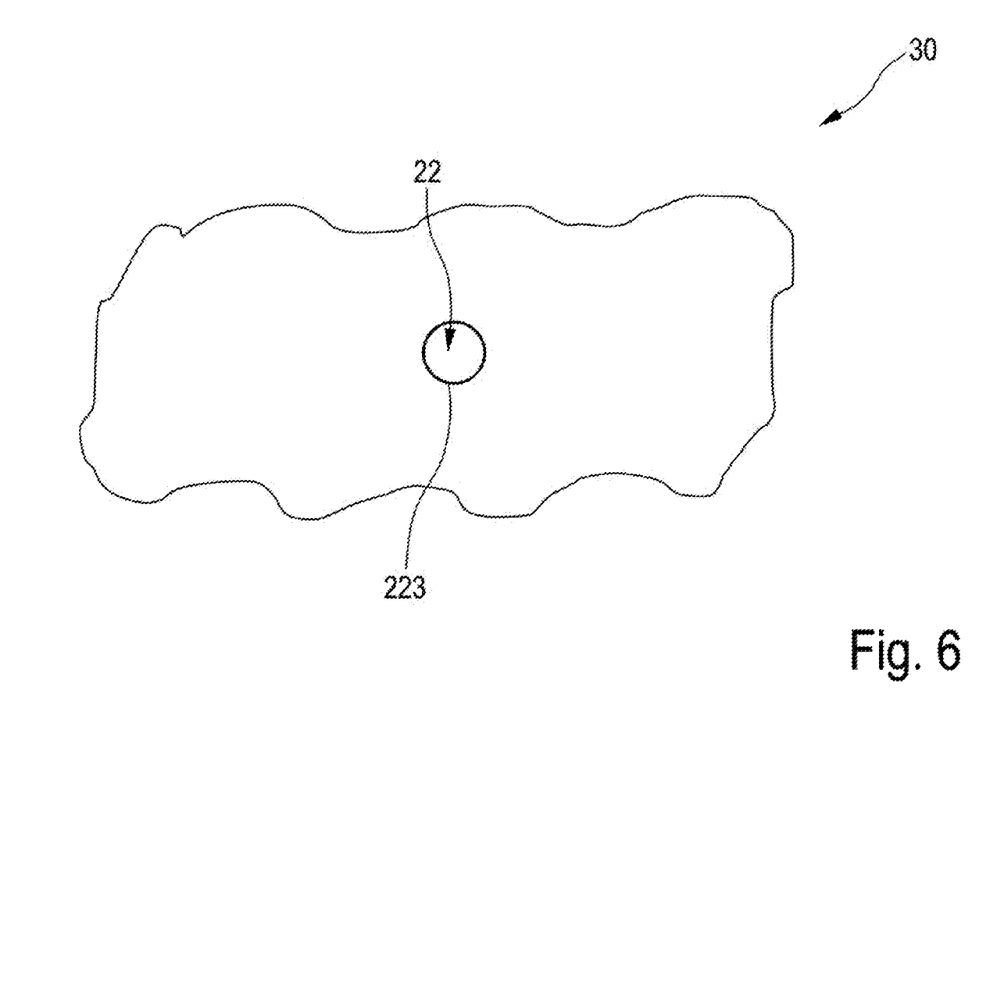
FIG. 6 shows a schematic horizontally sectioned cross sectional view of an exemplary embodiment of a support element of a structural component according to the invention.

FIG. 6 shows a schematic horizontally sectioned cross sectional view of a fragment of the support element 30 of the structural component. A hole 22 which is delimited from the surrounding support element 30 by a hole rim 223 is located in the center of the fragment of the support element 30. Furthermore, the fibers schematically illustrated in FIG. 5 are not depicted here, since the material of the support element 30 is not a fiber composite material and therefore, as opposed to the base element 20, does not include any fibers. The combination of a support element 30 of this type with a reinforcement element 21 (not illustrated here) offers the potential of providing a small material volume, in particular in the region of holes or other notches, while providing adequate strength. The overall weight can be reduced and material costs can in particular be saved on account thereof.

Figure 7:
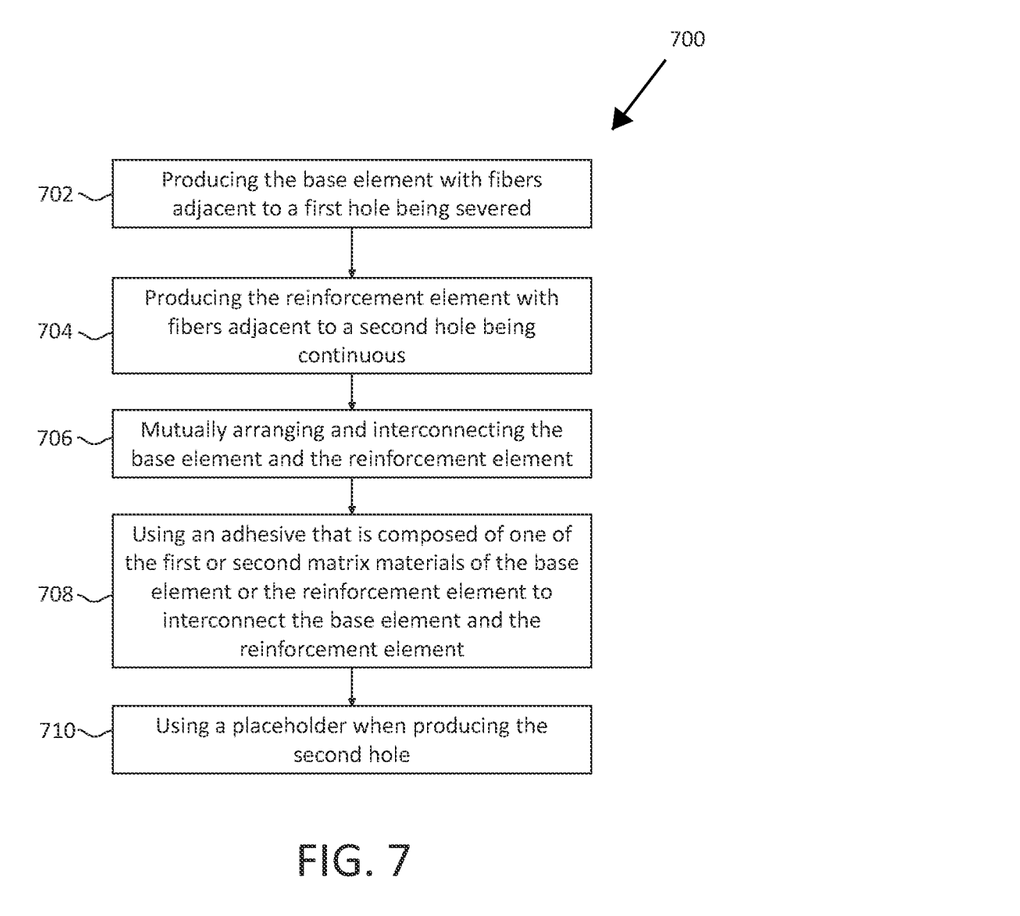
FIG. 7 shows a method for producing the fiber composite component.

FIG. 7 shows a method 700 for producing the fiber composite component. The method includes in a first block 702 producing a base element with fibers adjacent to a first hole being severed, and in a second block 704 producing the reinforcement element with fibers adjacent to a second hole being continuous. The method further includes in another block 706 mutually arranging and interconnecting the base element and the reinforcement element. The method may further include using an adhesive that is composed of one of the first or second matrix materials of the base element or the reinforcement element to interconnect the base element and the reinforcement element as shown by block 708. The method may further included using a placeholder when producing the second hole as shown by block 710. The placeholder, prior to or during the laying up of the fiber bundles, is placed at the location at which the hole is to be produced. The fiber bundles during the production of the reinforcement element are laid up around the place holder. The placeholder preferably has the same cross section as that of the hole to be produced. The placeholder is removed from the reinforcement element at the end of the production process.

REFERENCE SIGNS

2 Fiber composite component
20 Base element
21 Reinforcement element
22 Hole
23 Fibers, reinforcement element
24 Fibers, base element
30 Support element
100 Wind power installation
102 Tower
104 Nacelle
106 Rotor
108 Rotor blade
110 Spinner
211 First end, reinforcement element
212 Second end, reinforcement element
213 Widening, reinforcement element
221 Axis passing through hole
222 First hole rim
223 Second hole rim
224 Arrows
2221 Matrix material, reinforcement element
2231 Matrix material, base element
2232 Fiber ends

The invention claimed is:

1. A fiber composite component, comprising:
a base element comprising fibers embedded in a first matrix material;
a reinforcement element comprising fibers embedded in a second matrix material, wherein the base element and the reinforcement element are interconnected, wherein the reinforcement element is mountain shaped; and
a first hole through the base element and a second hole through the reinforcement element,
wherein the fibers of the base element that are adjacent to the first hole are severed, and the fibers of the reinforcement element that are adjacent to the second hole are not severed such that the fibers are continuous and flex around the second hole,
wherein the fiber composite component is part of a component of a wind power installation.

2. The fiber composite component as claimed in claim 1, wherein the fibers of the base element are disposed within the first matrix material as one or more of:
woven fabrics,
cross-laid structures,
multi-axis cross-laid structures, embroideries, non-woven material,
mats, and
braided fabrics,
and the fibers of the reinforcement element are fiber bundles.

3. The fiber composite component as claimed in claim 2, wherein the fibers of the reinforcement element are rovings.

4. The fiber composite component as claimed in claim 1, wherein at least one of: the fibers of the base element or the reinforcement element include one or more of:
organic fibers,
inorganic fibers, or
natural fibers.

5. The fiber composite component as claimed in claim 1, wherein at least one of: the first matrix material of the base element or the second matrix material of the reinforcement element includes a plastic material.

6. The fiber composite component as claimed in claim 5, wherein the plastic material is a thermoplastics material or a thermosetting plastics material.

7. The fiber composite component as claimed in claim 5, wherein the plastic material includes one or more of: cement, concrete, metal, ceramics, or carbon.

8. The fiber composite component as claimed in claim 1, wherein at least one of:
the base element and the reinforcement element are interconnected in a materially integral or form-fitting manner; or the base element and the reinforcement element are interconnected by way of the fibers embedded in the first matrix material of the base element and in the second matrix material of the reinforcement element.

9. A wind power installation comprising:
a tower;
a nacelle;
a rotor; and
the component that includes the fiber composite component as claimed in claim 1.

10. A method for producing the fiber composite component as claimed in claim 1, the method comprising:
producing the base element such that the fibers adjacent to the first hole are severed,
producing the reinforcement element such that the fibers adjacent to the second hole are continuous, and
mutually arranging and interconnecting the base element and the reinforcement element such that the first hole and the second hole are interconnected.

11. The method for producing the fiber composite component as claimed in claim 10, wherein interconnecting the base element and the reinforcement element comprises using an adhesive that is composed of one of the first or second matrix materials of the base element or the reinforcement element.

12. The method for producing the fiber composite component as claimed in claim 11, wherein a placeholder is used when producing the second hole.

13. The fiber composite component as claimed in claim 1, wherein the reinforcement element at an end of the second hole that faces away from the base element has a bearing face for receiving a connection element, the bearing face being planar in a manner orthogonal to a passage direction of the first and second holes.

14. A structural component for a wind turbine, comprising:
   a reinforcement element comprising fibers embedded in a matrix material,
   wherein the reinforcement element has sloped side portions forming a mountainous shape,
   wherein a hole extends through the reinforcement element, and
   wherein the fibers of the reinforcement element are not severed such that the fibers adjacent to the hole of the reinforcement element are continuous and flex around the hole,
   a support element coupled to the reinforcement element, and
   a hole extending through the support element, wherein the hole extending through the support element is aligned with the hole extending through the reinforcement element.

15. A method for producing the reinforcement element as claimed in claim 6, the method comprising:
   producing the reinforcement element from the fibers and from the matrix material,
   wherein producing the reinforcement element includes forming the hole, wherein all of the fibers that are adjacent to the hole remain continuous.

16. A method for producing the structural component as claimed in claim 14, the method comprising:
   producing the support element,
   forming the hole in the support element,
   producing the reinforcement element having the hole, and
   mutually arranging and interconnecting the support element and the reinforcement element in such a manner that the hole of the support element and the hole of the reinforcement element are interconnected.

* * * * *

UNITED STATES PATENT AND TRADEMARK OFFICE
CERTIFICATE OF CORRECTION

PATENT NO. : 11,285,688 B2
APPLICATION NO. : 16/067035
DATED : March 29, 2022
INVENTOR(S) : Florian Rubner It is certified that error appears in the above-identified patent and that said Letters Patent is hereby corrected as shown below:

In the Claims

Column 20, Claim 15, Line 2:
"claimed in claim 6, the method comprising"
Should read:
--claimed in claim 14, the method comprising--.

Signed and Sealed this
Twenty-third Day of January, 2024

Katherine Kelly Vidal
*Director of the United States Patent and Trademark Office*